June 5, 1956  T. R. BAXTER  2,749,020
BAG
Filed July 19, 1950
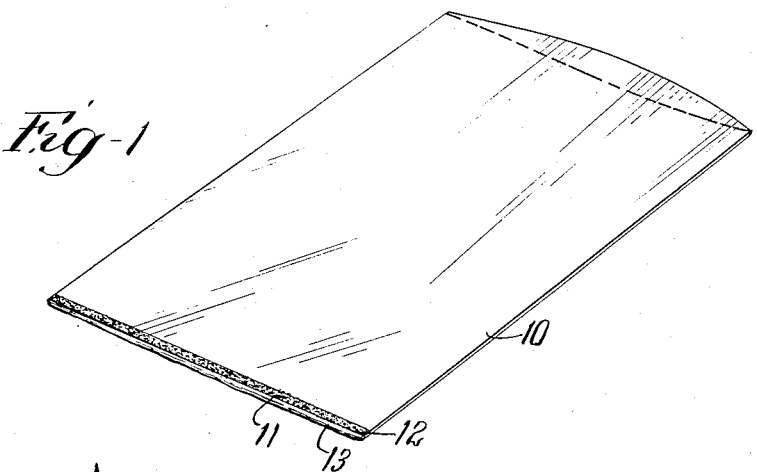
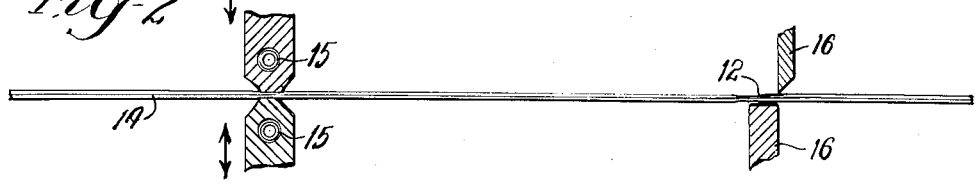
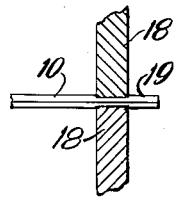 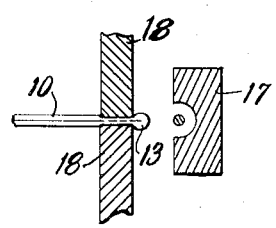
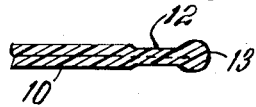
INVENTOR.
Thomas R. Baxter
BY
Cromwell, Greist & Warden United States Patent Office 2,749,020
Patented June 5, 1956

2,749,020

BAG

Thomas R. Baxter, Mount Vernon, Ohio, assignor, by mesne assignments, to Continental Can Company, Inc., New York, N. Y., a corporation of New York Application July 19, 1950, Serial No. 174,604

8 Claims. (Cl. 229—53)

This invention relates to packaging and is more particularly concerned with the fabrication of a bag or receptacle of relatively flexible film-like material.

It is a general object of the invention to provide a bag which comprises a section of tubular material having a transverse closure which is characterized by a double seam structure.

It is a more specific object of the invention to provide a bag or receptacle and a method of fabricating the same from a relatively thin flexible sheet-like material such as polyethylene wherein the bag comprises a tubular body section closed at the end by a double seam which consists of a flat seam holding end portions of the tube in flat contacting relation and a bead seam integrally joining the adjacent marginal edges of the tube.

It is a further object of the invention to provide a method of fabricating a bag or receptacle in which a section of flattened tubular material is first provided along the marginal edges at one end with a flat seam holding a transversely extending band-like portion at the ends of the opposed walls of the section in face-to-face relation and thereafter a bead seam is formed by heating the end edge portions of the flat seam to a temperature sufficient to melt the material and fuse it when cooled into an integral bead-like formation.

It is another object of the invention to provide a method of fabricating a bag or receptacle wherein a tube-like section of a material having the characteristics of polyethylene is transversely sealed with a flat seam across the marginal edges of one end thereof and a predetermined portion of the flat seam adjacent the marginal edges is subjected to radiant heat for a sufficient period of time to cause the material to coalesce and, when cooled, to form an end closure.

These and other objects of the invention will be apparent from a consideration of the bag and the method of forming the same which are illustrated by way of example in the accompanying drawings, wherein:

Fig. 1 is a perspective view of a bag having incorporated therein the principles of the invention;

Figs. 2, 3 and 4 are schematic views illustrating the steps involved in producing the bag or receptacle; and Fig. 5 is a partial section through the completed closure seam.

In fabricating bags and packages wherein relatively thin flexible sheet-like material such as polyethylene film, or material having similar heat sealing characteristics is employed, it is difficult to obtain a satisfactory seal by ordinary methods. If a seal is formed by bringing the marginal edges of the material into face-to-face relation and applying heat and pressure, there is a limit to the heat and pressure which may be used before the material will reach the melting point and separate or dissolve without the formation of the seam. Seams formed by heat and pressure within the limits allowed will not stand up under high temperatures such as encountered in autoclaving. When it is desired to provide a bag or package which can be sterilized by means of autoclaving a closure or seam formed in the ordinary manner with heat and pressure is entirely unsatisfactory. Likewise, in fabricating containers for packaging liquids ordinary flat seals very often fail at the corners where fine openings are left which permit escape of the liquid contents due to capillary action.

A type of seal has been developed for use in connection with the fabrication of bags or packages of material having the melting and sealing characteristics of polyethylene in which marginal edges of the material forming the bag are brought into face-to-face relation, and while held in such relation, edge portions are subject to a flame or a source of radiant heat of sufficient temperature to cause the same to coalesce or melt and form a bead-like seam when cooled. Seams formed in this manner are satisfactory only if the edge portions of the bag material which are melted to form the seam are held in contact with each other throughout the entire seam forming area. If there is any buckling of the material which is permitted to extend beyond the clamping elements, which are usually employed to control or limit the area of fusing or coalescing, the bead is very likely to be formed on the separate edges and result in an incomplete or leaky seam.

In manufacturing bags or packages using material of the character here involved it is desirable to employ a procedure which will insure that when the edges of the material are subject to the flame or source of radiant heat they will be held in close contact so that the coalescing or melting of the material and the formation of the resulting bead will provide a continuous integral connection between the juxtaposed edges of the material and not result in two separate bead formations at any point along the seamed area.

In the formation of the bag 10 which is illustrated in Figs. 1 and 5 a section of flattened tubular material, either seamless tubing or a sheet or web longitudinally sealed to form a tube, is provided with a transverse bottom forming seam 11 which comprises a flat seam 12 consisting of a ribbon-like area extending across the flattened tube and a bead seal 13 which is an integral bead-like formation on the terminal edges of the material at the free end of the flat seam area 12. The bag 10 is thus provided with a double seam formation consisting of the flat seam 12 and a fused edge seam 13 which is integral with both walls of the body of the bag and which will withstand higher temperatures and pressures than the flat seam 12 alone.

Referring to Figs. 2 to 4, the bag 10 may be conveniently formed from a continuous length of tube 14 (Fig. 2) which is in flattened condition. The flattened tube 14 is passed between a pair of reciprocating heating bars 15 disposed at opposite sides of the tube and intermittently movable to a position in contact with the opposite surfaces of the same or closely adjacent thereto to provide transversely of the tube 14 a continuous ribbon-like sealed area 12. The tube 14 is moved thereafter between a pair of cutters 16 which are arranged to sever the flattened tubular material transversely at the edge of the flat sealed area 12.

The operations described result in the formation of successive bags 10 of predetermined length having a transversely extending flat sealed area 12 and being cut off or trimmed closely adjacent to or within the margins of the sealed area 12. The marginal edges of the seam 12 are then moved into position sufficiently close to a radiant heating element 17 and held for a sufficient time to allow a predetermined portion of the material at the edges of the seam 12 to be melted or coalesced. In performing this operation preferably a pair of grippers 18 are employed which are engaged with the flattened tube on opposite faces at the seam 12 leaving extending a relatively narrow margin 19. The bag 10 is moved to bring the end edges adjacent the heating element 17 and held there a sufficient length of time to cause the marginal portions 19 of the seam 12 to be melted back to the grippers 18 and to form an integral bead on the end of the bag. The limit of the melting of the material is determined, of course, by the location of the clamps 18 and may be controlled or varied by locating the clamps 18 the desired distance from the end of the tube. The material 19 extending beyond the clamps 18 is melted when subject to the radiant heat and when allowed to cool forms thereon an integral bead.

While the method illustrated involves the use of a continuous length of tube, it will be obvious that the seam may be formed on the end of a tubular section by properly locating the same between the heating elements 15 to form the flat seam 12, then engaging the same with the clamps 18 and subjecting the marginal portions of the seam 12 to the action of a radiant heater such as 17.

Also, it will be obvious that the herein disclosed seam and method of forming the same are applicable to the joining of two or more sheets of the material for any other purpose, it being necessary only to bring the marginal edges of the sheets to be joined into flat contacting relation and to form therein successively the flat seam and the marginal edge bead seam.

I claim:

1. A bag formed of relatively flexible sheet material having heat sealing characteristics which comprises a tubular body portion and a double seam end closure consisting of a ribbon-like transversely extending flat seam and an adjoining bead seam formation extending along the marginal edge only of the flat seam.

2. A bag formed of relatively flexible polyethylene sheet material which comprises a tubular body portion and a double seam end closure characterized by a ribbon-like transversely extending flat seam formation and an integral bead seam formation extending along the marginal edge only of said flat seam formation.

3. A bag formed of relatively flexible sheet material which is characterized by its ability to melt along an edge when subject to melting temperatures and to form a bead along the same when cooled, said bag comprising a tubular body portion and an end closure comprising a combination seam including a relatively narrow transversely extending flat seam area and a bead seam formation extending in adjoining relation along the edge only of the flat seam area and integral therewith.

4. A method of fabricating a double seam which comprises bringing marginal edge portions of the material to be seamed into face-to-face relation, forming a flat heat sealed seam along a relatively narrow area, subjecting the marginal edges only of the flat seam area to sufficient heat to coalesce the same, allowing the coalesced material to cool and form thereon an integral bead seal adjoining the flat heat sealed seam.

5. A method of forming a bag which comprises providing a flattened tubular section of heat sealable material with a transversely extending flat heat sealed seam in an area adjacent the marginal edges thereof and thereafter forming on the edge portions only of the flat seam area an integral bead formation by heating and coalescing the edge portions of the material whereby to provide two adjoining cooperative seam formations.

6. A method of forming a double seam structure wherein edge portions of the material to be seamed are brought into face-to-face relation with the margins in substantial alignment, a flat heat seal of substantial width is formed along the marginal area and thereafter the outer end edge portions only of the material adjacent the flat heat seal are heated to a temperature sufficient to melt the material and form thereon when cooled an integral bead-like seal which adjoins the inner portions of the flat heat seal.

7. A double seam structure joining the marginal edges of sheets of relatively flexible heat sealable material which comprises a relatively narrow ribbon-like flat sealed area and an adjoining bead-like edge seal formation along the edge of the flat sealed area which is integral and which cooperates therewith to form a double seam structure.

8. A method of forming a bag which comprises providing a flattened tubular section of heat sealable material with a transversely extending end closure wherein the end closure is formed by heat sealing a flat seam area of substantial width adjacent the marginal edges of one end of the flattened tubular section and thereafter forming along the terminal edge of the flat seam area an integral bead formation by heating and coalescing edge portions only of the material, said edge portions extending into a portion only of the flat seam area.

References Cited in the file of this patent

UNITED STATES PATENTS

| | | |
|---|---|---|
| 2,067,948 | Potdevin | Jan. 19, 1937 |
| 2,114,855 | Munson | Apr. 19, 1938 |
| 2,282,258 | Snyder | May 5, 1942 |
| 2,412,544 | Waters | Dec. 10, 1946 |
| 2,422,725 | Gilfillan | June 24, 1947 |
| 2,488,212 | Lloyd, Jr. | Nov. 15, 1949 |
| 2,524,584 | Zehr | Oct. 3, 1950 |